United States Patent
Su

(10) Patent No.: US 8,508,921 B2
(45) Date of Patent: Aug. 13, 2013

(54) HOUSING ASSEMBLY AND PORTABLE ELECTRONIC DEVICE HAVING THE SAME

(75) Inventor: Chih-Hung Su, Zhonghe (TW)

(73) Assignee: Lite-On Technology Corporation, Taipei (TW)

( * ) Notice: Subject to any disclaimer, the term of this patent is extended or adjusted under 35 U.S.C. 154(b) by 242 days.

(21) Appl. No.: 13/031,937

(22) Filed: Feb. 22, 2011

(65) Prior Publication Data

US 2012/0212884 A1  Aug. 23, 2012

(51) Int. Cl.
*H05K 5/00* (2006.01)
*H05K 7/00* (2006.01)
*A45C 1/04* (2006.01)

(52) U.S. Cl.
USPC ............ 361/679.01; 361/679.24; 361/679.29; 361/679.57; 361/679.58; 224/666; 224/667

(58) Field of Classification Search
USPC ............. 361/679.01, 679.02, 679.08, 679.09, 361/679.3, 679.55–679.59; 455/575.1, 575.3, 455/575.4, 575.8; 224/195, 666–678, 269–272, 224/930
See application file for complete search history.

(56) References Cited

U.S. PATENT DOCUMENTS 6,311,881 B1 * 11/2001 Kamiya ........................ 224/195
6,978,517 B2 * 12/2005 Collins et al. .................. 24/3.12

* cited by examiner

*Primary Examiner* — Zachary M Pape
*Assistant Examiner* — Jerry Wu
(74) *Attorney, Agent, or Firm* — Li & Cai Intellectual Property (USA) Office

(57) ABSTRACT

A housing assembly having a housing and a clip. The housing has a pair of raised ridge portions and a first locking portion formed between the pair of raised ridge portions. Each of the pair of raised ridge portions has an undercut side wall and the undercut side wall defines a sliding groove. Additionally, the pair of raised ridge portions has a first entrance port and a second entrance port at two ends thereof. The clip has an insertion portion, a bent portion and a clamp portion. The insertion portion has side edges for inserting within the pair of raised ridge portions through either of the first entrance port and the second entrance port and a second locking portion.

20 Claims, 6 Drawing Sheets

HOUSING ASSEMBLY AND PORTABLE ELECTRONIC DEVICE HAVING THE SAME

BACKGROUND OF THE INVENTION

1. Field of the Invention

The present invention relates to a housing assembly and a portable electronic device having the same. In particular, the present invention relates to a housing assembly that has detachable clip for fastening a portable electronic device on an object.

2. Description of Related Art

To improve the portability of electronic devices, it is common for a user to carry the portable electronic device using holder or clip assembly. For example, one method of carrying a portable electronic device is with a clip affixed to a housing of the portable electronic device. Using the clip, the portable electronic device can be attached to an article of clothing worn by a user. Similarly, the vehicle electronic device can be attached on the sun visor by the clip-type method. However, the traditional clip is engaged on the housing of the vehicle electronic device in one direction. When the sun visor is rotated by the driver or the passenger, the displaying orientation of the vehicle electronic device is rotated with the sun visor. As a result, the driver or the passenger cannot watch the display screen of the vehicle electronic device normally.

On the other hand, it is not convenient for the user to disengage the clip from the housing because of the high friction between the clip and the housing.

SUMMARY OF THE INVENTION

One particular aspect of the present invention is to provide an improved clip attachment structure for portable electronic devices.

The instant disclosure provides a housing assembly having a housing and a clip. The housing has a pair of raised ridge portions and a first locking portion formed between the pair of raised ridge portions. Each of the pair of raised ridge portions has an undercut side wall and the undercut side wall defines a sliding groove. Additionally, the pair of raised ridge portions has a first entrance port and a second entrance port at two ends thereof. The clip has an insertion portion, a bent portion and a clamp portion. The insertion portion has side edges and a second locking portion. The side edges of the insertion portion are for inserting within the pair of raised ridge portions through either of the first entrance port and the second entrance port.

The instant disclosure provides a portable electronic device having electronic circuitry. The portable electronic device includes a housing and a clip. The housing of the portable electronic device is for enclosing the electronic circuitry. The housing has a pair of raised ridge portions and a first locking portion formed between the pair of raised ridge portions. Each of the pair of raised ridge portions has an undercut side wall and the undercut side wall defines a sliding groove. Additionally, the pair of raised ridge portions has a first entrance port and a second entrance port at two ends thereof. The clip has an insertion portion, a bent portion and a clamp portion. The insertion portion has side edges and a second locking portion. The side edges of the insertion portion are for inserting within the pair of raised ridge portions through either of the first entrance port and the second entrance port.

For further understanding of the present invention, reference is made to the following detailed description illustrating the embodiments and examples of the present invention. The description is for illustrative purpose only and is not intended to limit the scope of the claim.

DETAILED DESCRIPTION OF THE PREFERRED EMBODIMENTS

Figure 1:
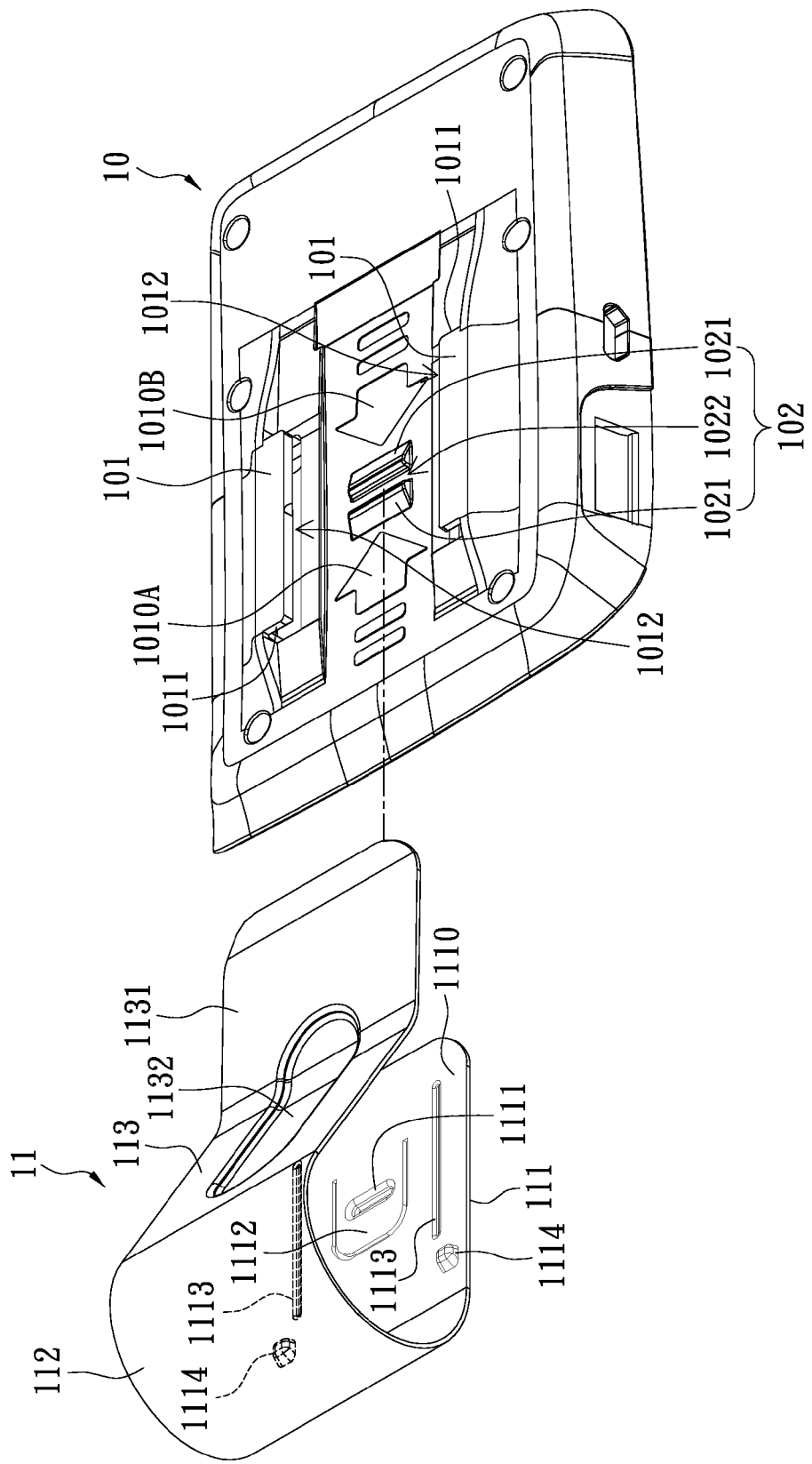
FIG. 1 shows the explored view of the housing assembly of the instant disclosure.

FIG. 1 shows the exploded view of a housing assembly including a housing 10 and a clip 11. In accordance with the embodiment of the instant disclosure, the housing 10 can be a rear cover which can be assembled with a front cover constructed for a portable electronic device, but not restricted thereby. The housing 10 can be constructed to enclose electronic circuitry and a display unit. The electronic circuitry includes an antenna, a signal receiver and a processer. The signal receiver is coupled to the antenna, the processer is for processing received signal demodulated by the signal receiver. The display unit is for displaying the data of the processed signal. Furthermore, the received signal can be accessed by the user through the controlling interface.

As shown in FIG. 1, the housing 10 has a pair of raised ridge portions 101 and a first locking portion 102 formed on the outer surface thereof. The pair of raised ridge portions 101 have a first entrance port 1010A and a second entrance port 1010B at two ends thereof so that the clip 11 can be inserted in the pair of raised ridge portions 101 through the first entrance port 1010A or the second entrance port 1010B.

Each of the pair of raised ridge portions 101 has an undercut side wall 1011 and which defines a sliding groove 1012. In other words, the undercut side wall 1011 can be an inverted L-shape and the undercut side wall 1011 is preferably integrally formed with the housing 10. On the other hand, the sliding groove 1012 is defined between the undercut side wall 1011 and the outer surface of the housing 10.

The first locking portion 102 is substantially formed between the pair of raised ridge portions 101. In the instant disclosure, the first locking portion 102 has a pair of protrusions 1021 formed on the housing 10 and a recess 1022 defined between the pair of protrusions 1021. Each of the protrusions 1021 has an inner sloped surface opposite to each other, and an outer sloped surface connected the inner sloped surface corresponding to the first entrance port 1010A and the second entrance port 1010B, respectively. The outer sloped surface has a slope less than that of the inner sloped surface.

The clip 11 is detachably attached on the housing 10. In the instant disclosure, the clip 11 is formed by metal materials, which is a singularly molded and durable element. The clip 11 has an insertion portion 111, a bent portion 112 and a clamp portion 113 wherein the insertion portion 111 and the clamp portion 113 are formed on two ends of the bent portion 112. The insertion portion 111 is substantially a planar structure and has a second locking portion 1111 thereon. The clamp portion 113 is extended correspondingly to the outer surface of the housing 10 to clamp object therebetween. Additionally, the insertion portion 111 has side edges 1110 for inserting within the pair of raised ridge portions 101.

Figure 3:
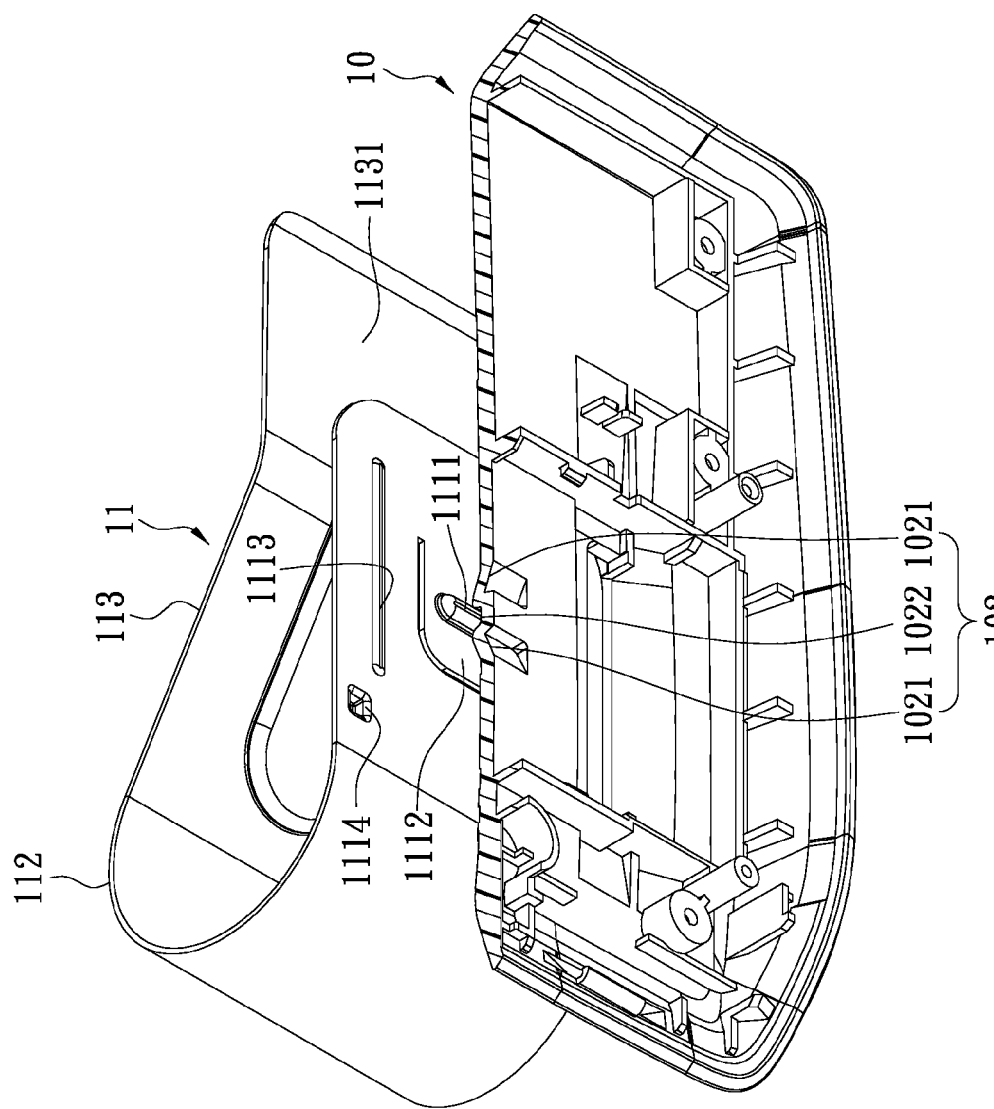
FIG. 3 shows the partial cutting-view of the housing assembly of the instant disclosure.

During insertion of the clip 11 through the first entrance port 1010A of the housing 10, the side edges 1110 of the insertion portion 111 are moving along the sliding groove 1012. When the second locking portion 1111, for example, a stub extrusion sits into the recess 1022 (as shown in FIG. 3), the insertion portion 111 of the clip 11 interlocks the housing 10 with the pair of raised ridge portions 101. In the instant disclosure, the insertion portion 111 has a tongue structure 1112 and the second locking portion 1111 is substantially formed on the free end of the tongue structure 1112. During insertion, the stub extrusion (i.e., the second locking portion 1111) and one of the pair of protrusions 1021 interfered with each other and thus the free end of the tongue structure 1112 is pressed. Accordingly the tongue structure 1112 is capable of providing an elastic force so that the stub extrusion can interlock within the recess 1022 when affixing the clip 11 onto the housing 10. Having the engagements of the side edges 1110 to the pair of raised ridge portions 101 and the second locking portion 1111 to the first locking portion 102 provides a secure fastening of the clip 11 to the housing 10.

Figure 4:
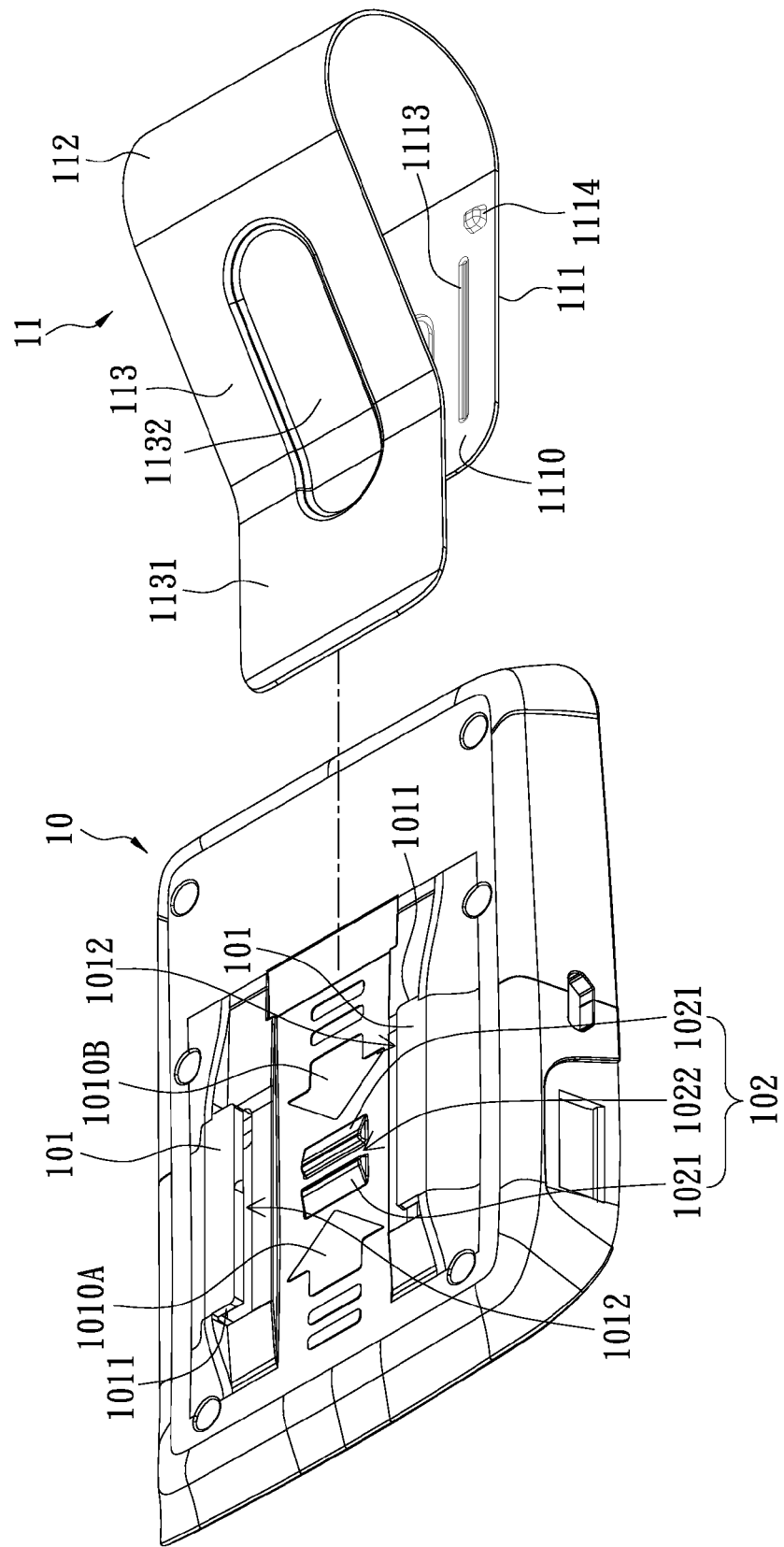
FIG. 4 shows that the clip is assembled to the housing through the second entrance port of the instant disclosure.

Similarly, the side edges 1110 of the insertion portion 111 are moving along the sliding groove 1012 during insertion of the clip 11 through the second entrance port 1010B. As shown in FIG. 4, once the second locking portion 1111 has engaged with the first locking portion 102, the clip 11 is secured on the housing 10. In addition, for engaging the second locking portion 1111 in the either case of inserting the clip 11 through the first entrance port 1010A and the second entrance port 1010B, the first locking portion 102 is preferably centered about the first entrance port 1010A and the second entrance port 1010B.

Providing a user of the portable electronic device with the instant disclosure allows a firm and bi-directionally detachable housing 10 for affixing or unaffixing the clip 11. A user of the portable electronic device will find it easier to change the display orientation when the portable electronic device is clamped on the different objects. On the other hand, no special tool is required for unaffixing or adjusting the insertion of the clip 11. Specifically, by exerting force on the clip 11 opposite the direction of inserting the clip 11, the second locking portion 1111 is disengaged from the first locking portion 102. Hence, it is efficient for the user to unaffix the clip 11 or to assemble the clip 11 through another entrance port.

Additionally, the insertion portion 111 further has at least one rib 1113 to guide the insertion portion 111 during insertion and a pair of stopping protrusions 1114 corresponding to the pair of raised ridge portions 101. As shown in FIG. 1, the insertion portion 111 has two ribs 1113 parallel to each other and the two ribs 1113 are disposed at two sides of the second locking portion 1111. The ribs 1113 are used to guide the insertion portion 111 within the sliding groove 1012. Most importantly, the ribs 1113 contact the housing 10 with a substantial linear surface, thereby reducing the friction between the insertion portion 111 of the clip 11 and the housing 10.

The insertion portion 111 has a pair of stopping protrusions 1114 formed substantially near the bent portion 112 to assist in engaging the clip 11 on the housing 10. When the second locking portion 1111 has engaged with the first locking portion 102, the stopping protrusions 1114 respectively abut against the pair of raised ridge portions 101. More specifically, one of the stopping protrusions 1114 abuts against the end flange of the undercut side wall 1011 to stop the further movement when the second locking portion 1111 is engaged with the first locking portion 102.

Figure 2:
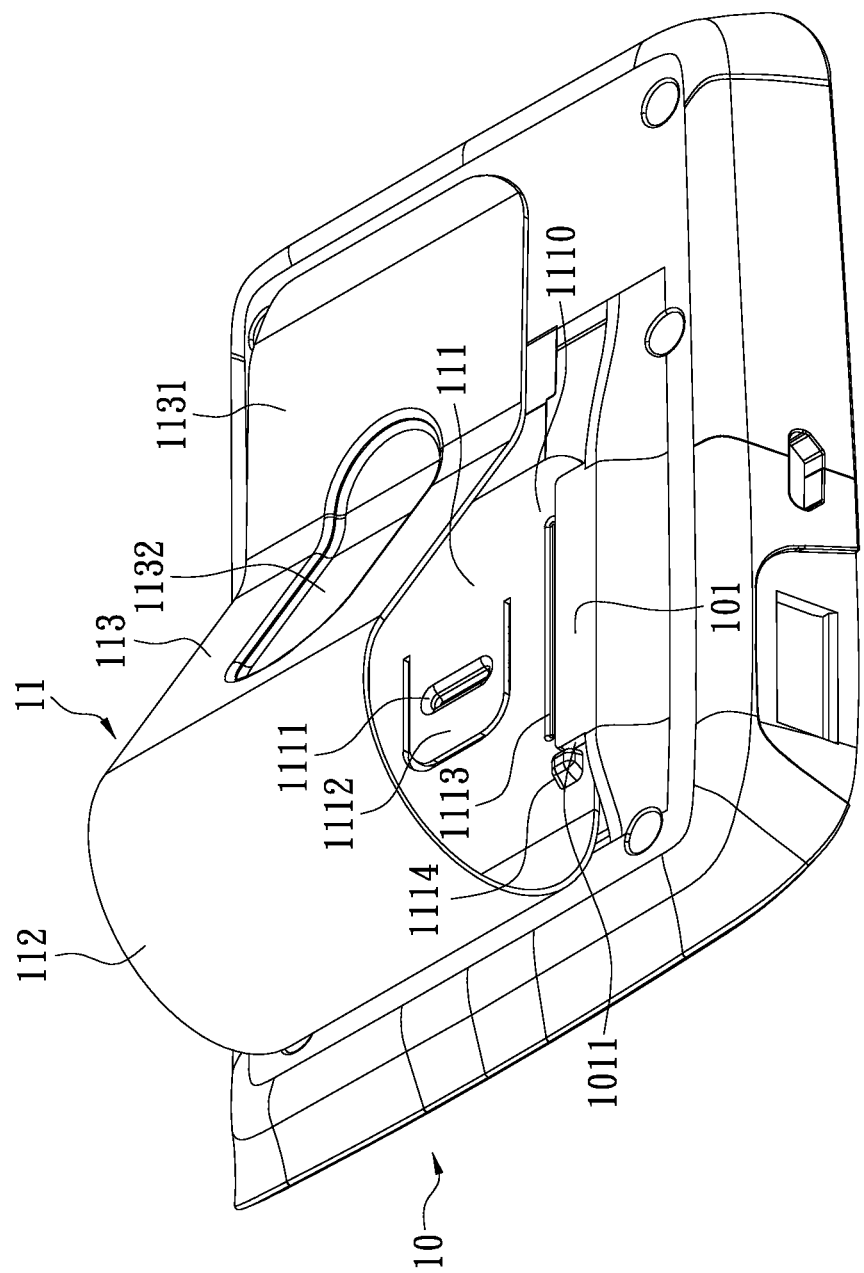
FIG. 2 shows the perspective view of the housing assembly of the instant disclosure.

Reference is made to FIGS. 1 and 2; the clamp portion 113 further has an object-clamping projection 1132. The object-clamping projection 1132 extends toward the insertion portion 111. Therefore, the gap between the clamp portion 113 and the housing 10 is decreased by the thickness of the object-clamping projection 1132 to assist the clamping stability when the portable electronic device is clamped on the object.

Figure 5:
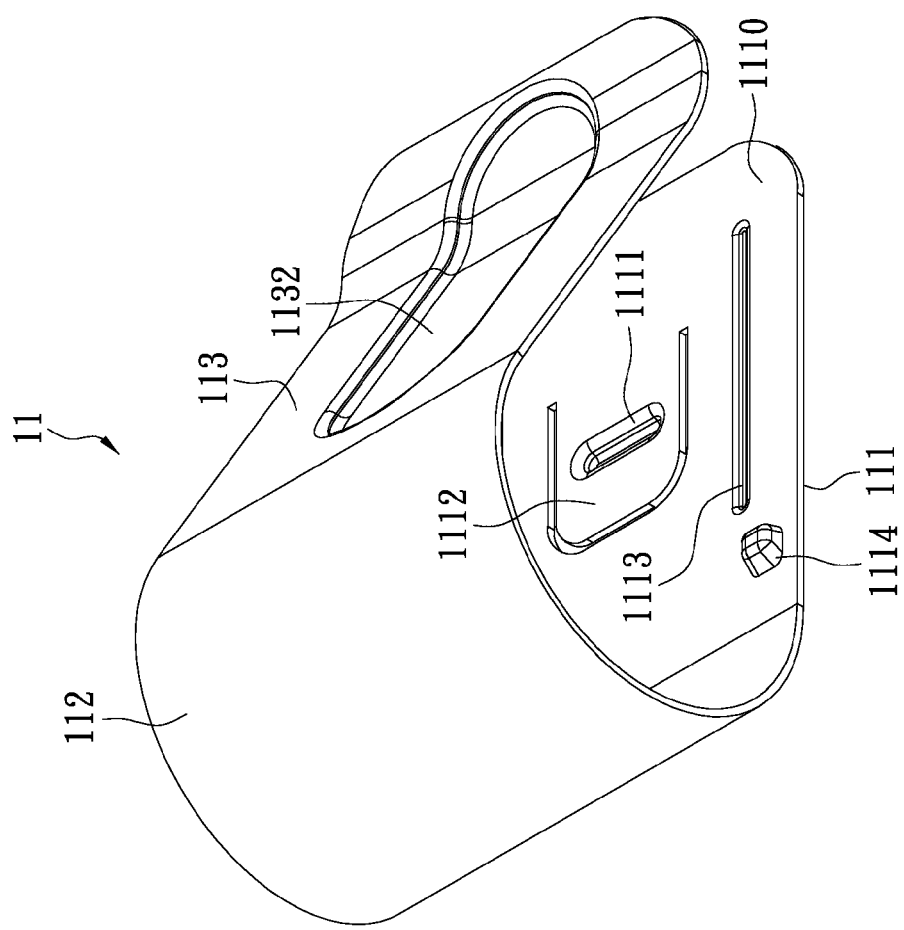
FIG. 5 shows another embodiment of the clip of the instant disclosure.
Figure 5A:
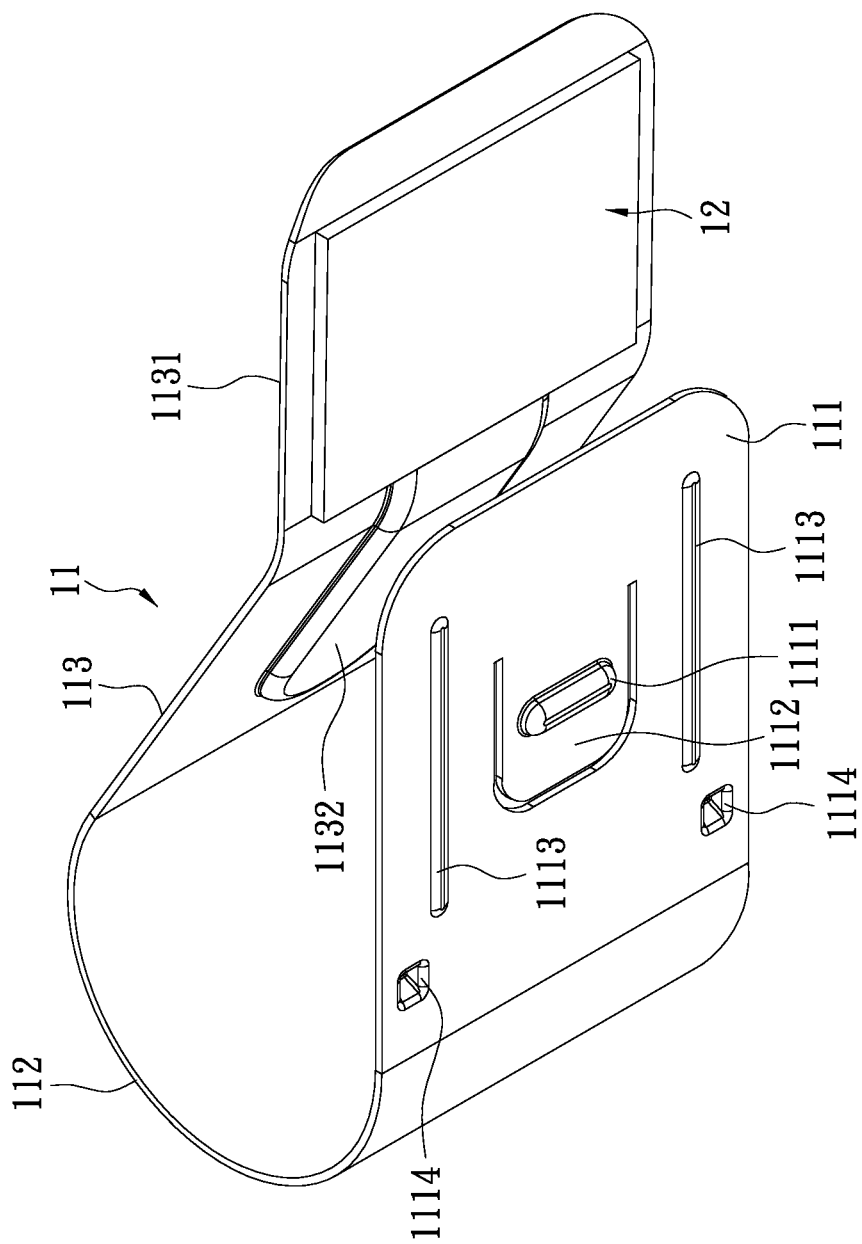
FIG. 5A shows still another embodiment of the clip of the instant disclosure.

Furthermore, the clamp portion 113 further has an elongated region 1131 and an elastic member 12 (in FIG. 5A). Comparing with FIGS. 1 and 5, the clamp portion 113 of FIG. 5 has no elongated region 1131. The elongated region 1131 is extended from the free end of the clamp portion 113 and the elastic member 12 can be attached on the free end of the clamp portion 113. With the elongated region 1131 and the elastic member 12, the clamping stability of mounting the portable electronic device on the object is improved.

In many respects the embodiments are advantageous over the traditional portable devices. For example, the pair of raised ridge portions 101 has two entrance ports, i.e., the first entrance port 1010A and the second entrance port 1010B. Consequently, the clip 11 can selectively insert into the pair of raised ridge portions 101 through the first entrance port 1010A and the second entrance port 1010B for changing the displaying orientation which is suitable for user's looking. With the ribs 1113, moving the insertion portion 111 of the clip 11 within the sliding groove 1012 is made smooth due to the low friction between the ribs 1113 of the clip 11 and the housing 10, thereby improving the affixing and unaffixing the clip 11 with the housing 10.

By now it should be appreciated that there has been provided a novel structure for inserting the clip 11 onto the housing 10 of the portable electronic device, such as a hands-free car kit or GPS apparatus.

The description above only illustrates specific embodiments and examples of the present invention. The present invention should therefore cover various modifications and variations made to the herein-described structure and operations of the present invention, provided they fall within the scope of the present invention as defined in the following appended claims.

What is claimed is:

1. A housing assembly comprising:
   a housing, the housing having a pair of raised ridge portions and a first locking portion formed between the pair of raised ridge portions, each of the pair of raised ridge portions having an undercut side wall, the undercut side wall defining a sliding groove, the pair of raised ridge portions having a first entrance port and a second entrance port at two ends thereof, wherein the housing defines a display orientation; and
   a clip attaching the housing, the clip having an insertion portion, a bent portion curvedly extended from the insertion portion and a clamp portion extended from the bent portion, the insertion portion having side edges and a second locking portion, the side edges of the insertion portion being for inserting within the pair of raised ridge portions through either of the first entrance port in a first direction or the second entrance port in a second direction opposite to the first direction for changing the display orientation,
   wherein the second locking portion is engaged with the first locking portion for latching the clip to the housing.

2. The housing assembly as claimed in claim 1, wherein the insertion portion further has a tongue structure, and the second locking portion is formed on the tongue structure.

3. The housing assembly as claimed in claim 2, wherein the second locking portion is a stub extrusion.

4. The housing assembly as claimed in claim 3, wherein the first locking portion has a pair of protrusions formed on the housing, and a recess defined between the pair of protrusions correspondingly to the stub extrusion, wherein each of the protrusions has an inner sloped surface opposite to each other, and an outer sloped surface connected the inner sloped surface corresponding to the first entrance port and the second entrance port respectively, wherein the outer sloped surface has a slope less than that of the inner sloped surface.

5. The housing assembly as claimed in claim 1, wherein the insertion portion further has at least one rib to guide the insertion portion during insertion.

6. The housing assembly as claimed in claim 1, wherein the insertion portion further has a pair of stopping protrusions corresponding to the pair of raised ridge portions.

7. The housing assembly as claimed in claim 1, wherein the clamp portion further has an object-clamping projection.

8. The housing assembly as claimed in claim 1, wherein the clamp portion further has an elongated region.

9. The housing assembly as claimed in claim 1, wherein the clip further has an elastic member attaching a free end of the clamp portion.

10. A portable electronic device having electronic circuitry, the portable electronic device comprising:
 a housing for enclosing the electronic circuitry, the housing having a pair of raised ridge portions and a first locking portion formed between the pair of raised ridge portions, each of the pair of raised ridge portions having an undercut side wall, the undercut side wall defining a sliding groove, the pair of raised ridge portions having a first entrance port and a second entrance port at two ends thereof, wherein the housing defines a display orientation; and
 a clip attaching the housing, the clip having an insertion portion, a bent portion curvedly extended from the insertion portion and a clamp portion extended from the bent portion, the insertion portion having side edges and a second locking portion, the side edges of the insertion portion being for inserting within the pair of raised ridge portions through either of the first entrance port in a first direction or the second entrance port in a second direction opposite to the first direction for changing the display orientation,
 wherein the second locking portion is engaged with the first locking portion for latching the clip to the housing.

11. The portable electronic device as claimed in claim 10, wherein the insertion portion further has a tongue structure, and the second locking portion is formed on the tongue structure.

12. The portable electronic device as claimed in claim 11, wherein the second locking portion is a stub extrusion.

13. The portable electronic device as claimed in claim 12, wherein the first locking portion has a pair of protrusions formed on the housing, and a recess defined between the pair of protrusions correspondingly to the stub extrusion, wherein each of the protrusions has an inner sloped surface opposite to each other, and an outer sloped surface connected the inner sloped surface corresponding to the first entrance port and the second entrance port respectively, wherein the outer sloped surface has a slope less than that of the inner sloped surface.

14. The portable electronic device as claimed in claim 10, wherein the insertion portion further has at least one rib to guide the insertion portion during insertion.

15. The portable electronic device as claimed in claim 10, wherein the insertion portion further has a pair of stopping protrusions corresponding to the pair of raised ridge portions.

16. The portable electronic device as claimed in claim 10, wherein the clamp portion further has an object-clamping projection.

17. The portable electronic device as claimed in claim 10, wherein the clamp portion further has an elongated region.

18. The portable electronic device as claimed in claim 10, wherein the clip further has an elastic member attaching a free end of the clamp portion.

19. The portable electronic device as claimed in claim 10, wherein the housing is a rear cover which is assembled with a front cover constructed for enclosing the electronic circuitry.

20. The portable electronic device as claimed in claim 10, further comprising a display unit, wherein the housing is a rear cover which is assembled with a front cover constructed for enclosing the display unit.

* * * * *